United States Patent [19]

Kylmänen et al.

[11] Patent Number: 4,536,120
[45] Date of Patent: Aug. 20, 1985

[54] FEEDING MEANS FOR FEEDING SOLID FUEL FROM A STORAGE SILO OR EQUIVALENT INTO A SOLID FUEL HEATING BOILER

[75] Inventors: Pasi Kylmänen; Pasi Takalo, both of Finnish, Finland

[73] Assignee: Saastamoinen Oy, Finland

[21] Appl. No.: 459,632

[22] PCT Filed: May 14, 1981

[86] PCT No.: PCT/FI81/00033

§ 371 Date: Dec. 27, 1982

§ 102(e) Date: Dec. 27, 1982

[87] PCT Pub. No.: WO 82/04113

PCT Pub. Date: Nov. 25, 1982

[51] Int. Cl.³ .............................................. F23K 3/00
[52] U.S. Cl. .................................... 414/173; 414/304; 222/228; 222/235; 110/108; 110/118
[58] Field of Search .............. 414/173, 176, 187, 198, 414/304, 325, 324, 310; 110/101 R, 105, 108, 118, 222, 223; 222/227, 228, 232, 235, 410

[56] References Cited

U.S. PATENT DOCUMENTS

| | | | |
|---|---|---|---|
| 1,178,086 | 4/1916 | Lummis | 414/173 |
| 1,524,356 | 1/1925 | Hübner | 414/173 |
| 1,904,716 | 4/1933 | Biggs | 414/198 X |
| 2,319,935 | 4/1939 | Lower | 110/104 |
| 2,423,110 | 7/1947 | Mosshart | 414/176 X |
| 2,624,565 | 6/1949 | Kompart | 414/187 X |
| 3,038,643 | 6/1962 | van der Lely et al. | 222/228 X |
| 3,179,264 | 4/1965 | Tallquist | 414/304 |
| 3,460,722 | 8/1969 | Jung | 414/304 X |
| 3,559,823 | 2/1971 | Ostrin | 414/173 |
| 3,824,937 | 7/1974 | Turner | 110/102 |
| 3,985,244 | 10/1976 | Gessler et al. | 414/304 |
| 4,167,248 | 9/1979 | Akazawa et al. | 222/227 X |

FOREIGN PATENT DOCUMENTS

| | | |
|---|---|---|
| 22981 | 4/1918 | Denmark . |
| 59653 | 4/1942 | Denmark . |
| 74080 | 7/1893 | Fed. Rep. of Germany . |
| 2821767 | 11/1979 | Fed. Rep. of Germany . |
| 40187 | 11/1968 | Finland . |
| 107426 | 8/1965 | Norway . |
| 32806 | 10/1911 | Sweden . |

Primary Examiner—Joseph E. Valenza
Assistant Examiner—David A. Bucci
Attorney, Agent, or Firm—Steinberg & Raskin

[57] ABSTRACT

The invention concerns an apparatus for feeding solid fuel from a storage silo or equivalent to a solid fuel-using heating boiler. The feeding apparatus comprises a piston, which has been disposed to carry out a reciprocating motion within a tube which through an aperture communicates with the solid fuel storage silo or equivalent, and which communicates by its other end with the heating boiler. With a view to accomplishing the feeding of the solid fuel with reliable certainty, before the piston, in the feeding apparatus of the invention there has been provided in the lower part of the storage silo or equivalent, a rotatably disposed vane.

12 Claims, 4 Drawing Figures

FEEDING MEANS FOR FEEDING SOLID FUEL FROM A STORAGE SILO OR EQUIVALENT INTO A SOLID FUEL HEATING BOILER

BACKGROUND OF THE INVENTION

The present invention concerns a feeding means serving to feed into a solid fuel-using heating boiler, solid fuel from a storage silo or equivalent, said feeding means comprising a piston means disposed to move reciprocatingly in a tube means communicating by an aperture with the solid fuel storage silo or equivalent and communicating by its other end with the heating boiler.

As a consequence of the continuous increase in price of oil, the use of solid fuel, such as wood chips, peat etc., is increasing at an accelerating rate in heating energy generation. Several different types of chipping machines for chip production are known. The operation of conventional chippers is based on a rotating drum-like roll which serves as blade and against which the wood is radially fed by the aid of separate feeding means. Such chippers require a high power input, whereby the producing of chips involves comparatively high expenditure.

It has been found that larger sized chips, or so-called lump chips, are better suited owing to their properties to be used towards heat production, compared with the above-mentioned common chips. To the purpose of lump chip producing, a lump chipper has been disclosed in the Finnish patent application No. 791491, comprising a rotating, conical screw. The helical surface of this screw acts as cutting blade and it provides the feeding of the wood, in addition to the chipping operation.

One advantage which lump chips have over conventional chips is that when stored in a heap, lump chips dry out because the air is able to pass through between the lump-shaped wood pieces. In contrast, conventional chips are too closely packed, whereby the burning of the wet chips in a boiler causes difficulties and extra costs, in addition to which the wet chips have a low calorific value.

At present, the feeding of lump chips into a heating boiler is accomplished by manual labour in that lump chips are shoveled into the furnace of the boiler as required. Quite obviously this problem solution is not satisfactory. In addition, the shovelling done as human labour is rather strenuous work.

Attempts have been made to find an appropriate apparatus solution for the feeding of lump chips, but these attempts have not met with any success so far. One has tried to use for the feeding of lump chips, a screw conveyor (as has been disclosed e.g. in the German publicizing print No. 2 821 767), but a feeding means of this type does not constitute any satisfactory solution.

Solid fuel has been fed from a storage silo or equivalent into a solid fuel-using heating boiler with the aid of so-called piston feeding means. Such a feeding means is disclosed e.g. in the Finnish Pat. No. 40187, in the Swedish Pat. No. 32.806 and in the German Pat. No. 74.080. This piston means of prior art comprises a piston in reciprocating motion, fitted into a passage which through an aperture communicates with a solid fuel storage silo or equivalent. The drawback encumbering these piston feeding means of prior art is that the solid fuel cannot be made with positive reliability to go from the storage silo or equivalent before the piston of the piston feeding means, owing to the vaulting tendency of the solid fuel.

SUMMARY OF THE INVENTION

The object of the invention is to provide a solid fuel feeding means by the aid of which solid fuel can be fed into a heating boiler continuously and in a way which is reliable in operation. Still another object of the invention is to provide a feeding means enabling the operation of the heating boiler to be automated with regard to the consumption of solid fuel. It is furthermore an object of the invention to provide a feeding means making sure of a long enough automatic operating period for heating boilers.

The objects of the invention are achieved by a solid fuel feeding means which is mainly characterized in that with a view to boosting the running of the solid fuel from the storage silo or equivalent through an aperture before the piston means enclosed in a tube means, there has been rotatably disposed a vane means in the lower part of the storage silo or equivalent.

With the feeding means of the invention numerous significant advantages are gained. First, the feeding means of the invention enables solid fuel to be continuously automatically fed into the heating boiler, in a manner which is absolutely reliable in operation. The feeding means of the invention also renders possible easy automation of the heating boiler with regard to its solid consumption. Moreover, thanks to the feeding means of the invention the heating boiler may operate during comparatively long periods under automatic control.

BRIEF DESCRIPTION OF THE DRAWINGS

The invention is described in detail with reference to advantageous embodiments of the invention, presented in the figures of the attached drawings, but to which the invention is not meant to be exclusively confined.

DETAILED DESCRIPTION OF THE PREFERRED EMBODIMENTS

Figure 1:
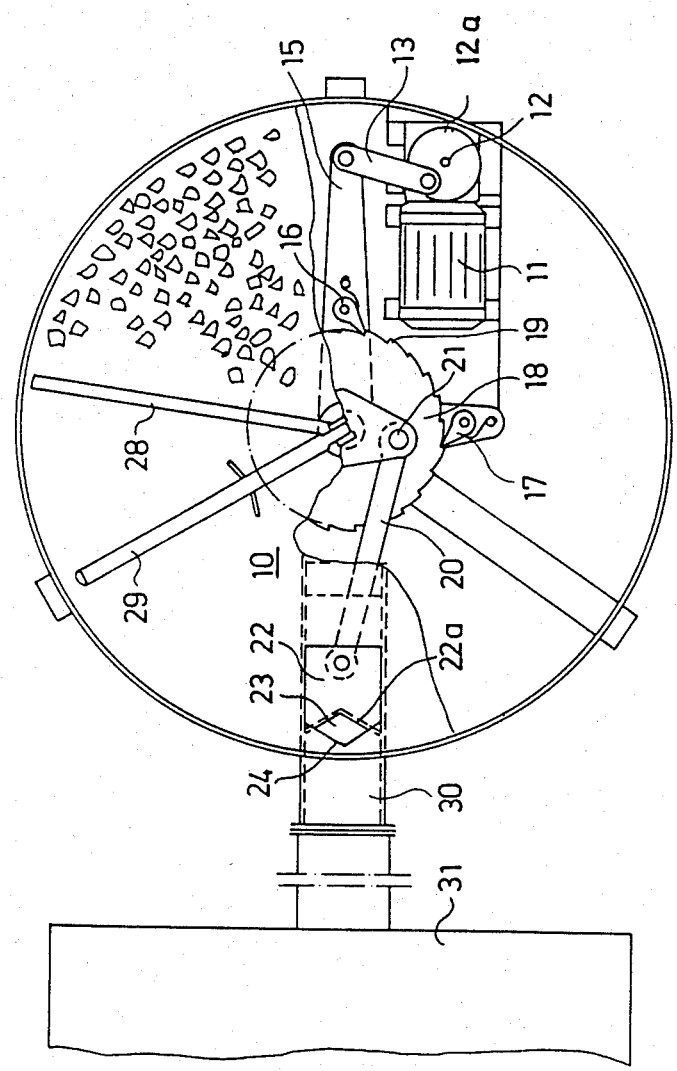
FIG. 1 shows an advantageous embodiment of the feeding means of the invention, in top view.
Figure 2:
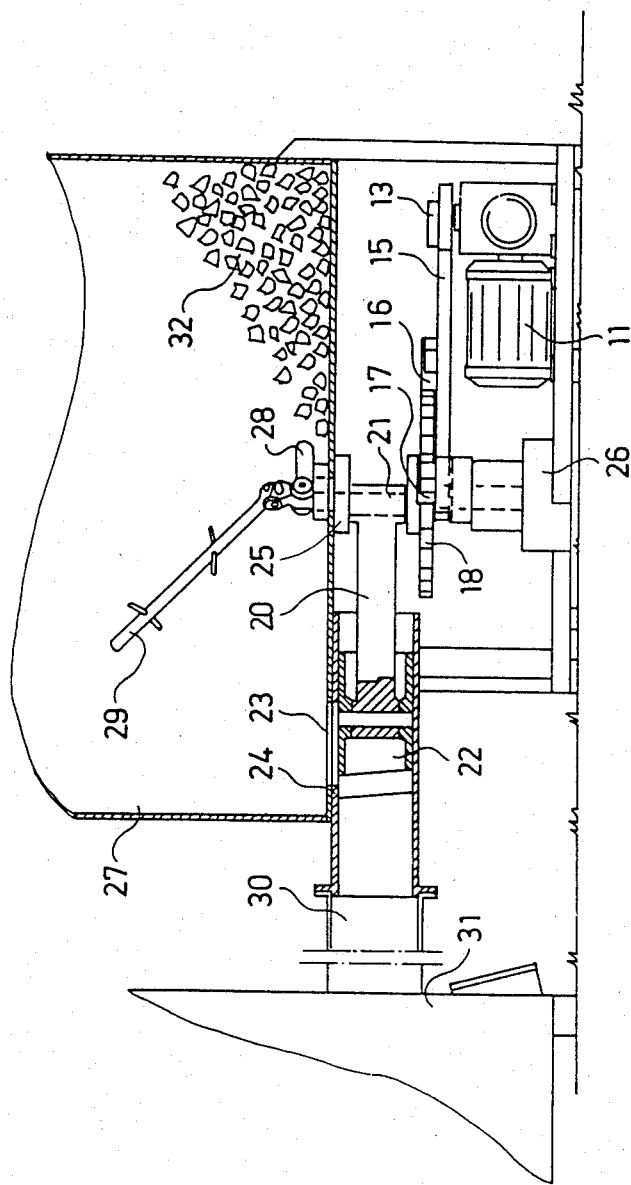
FIG. 2 shows the feeding means of FIG. 1, in elevational view.

In the embodiment of FIGS. 1 and 2, the feeding means of the invention has been generally indicated by the reference numeral 10. The feeding means 10 comprises a piston means 22 disposed to be reciprocatingly movable. The piston means 22 has been disposed to carry out its reciprocating motion in the tube 30, which communicates by the aperture 23 with the storage silo 27 valid for solid fuel, e.g. lump chips. Thus from the silo 27 through the aperture 23, solid fuel 32 runs continuously into the tube 30, and the reciprocatingly moving piston means 22 pushes the solid fuel forward in the tube 30. The tube 30 communicates by its other end with the heating boiler 31. In order that the flow of solid fuel 32 from the silo 27 through the aperture 23 before the piston means 22 in the tube 30 might be reliable, there has been rotatably disposed in the lower part of the silo 27, a vane means 28. The rotation of the vane means 28 within the silo 27 is preferably synchronized with the reciprocating motion of the piston means 22 as described later on. The edge 22a of the piston means is preferably made to have a V shape, whereby the piston means will efficiently push the solid fuel 32 forward in the tube 30. The upper margin 24 of the aperture 23 has been shaped to constitute a sharp cutting edge operating as counterblade and causing reliable chopping of the solid fuel 32 at the aperture 23, with the result that no occlusion will occur in the feeding of the solid fuel 32 in the tube 30, particularly not at the aperture 23.

In the embodiment of FIGS. 1 and 2 the motion of the piston means 22 has been accomplished by means of the following mechanism. A motor, for instance an electric motor, 11 has been disposed to drive over an eccentric cam 12a mounted on a shaft 12 and over a lever arm 13 and a connecting rod 15, and the pawl 16. The pawl 16 rotates the ratchet wheel 18, which carries a great number of teeth 19. The rotation of the ratchet wheel 18 has been delimited by means of a locking pawl 17. The rotational movement of the ratchet wheel 18 is transmitted by the connecting rod 20 to the piston means 22, whereby the piston means 22 performs a reciprocating motion. The reference numeral 21 indicates the bearing of the connecting rod 20. Reference numerals 25 and 26 indicate bearing arrangements which are necessary.

While the movement of the connecting rod 20 produces the reciprocating motion of the piston means 22, the movement of the connecting rod 20 at the same time causes rotary movement of the vane means 28 in such manner that the vane means 28 has run over the aperture 23 when the piston means is in its rear position, in the so-called rear deadpoint position.

In the storage silo 27 for solid fuel 32 there has been preferably disposed, upon the hub of the vane means 28 and pivotally attached, a mixing arm 29, by the aid of which any solid fuel 32 that may adhere to the walls of the silo 27 can be dropped into the lower part of the silo 27.

Figure 3:
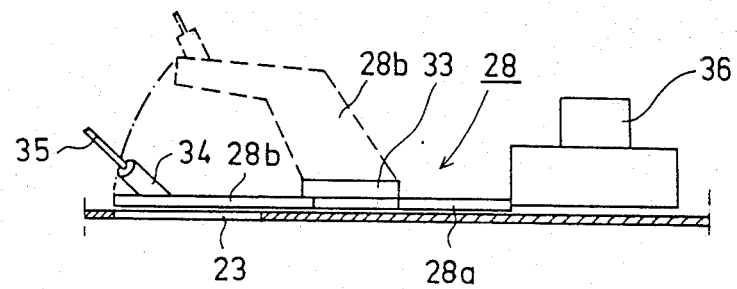
FIG. 3 shows, in elevational view, an advantageous embodiment of the vane means rotatably disposed in the lower part of the storage silo or equivalent belonging to the feeding means of the invention.
Figure 4:
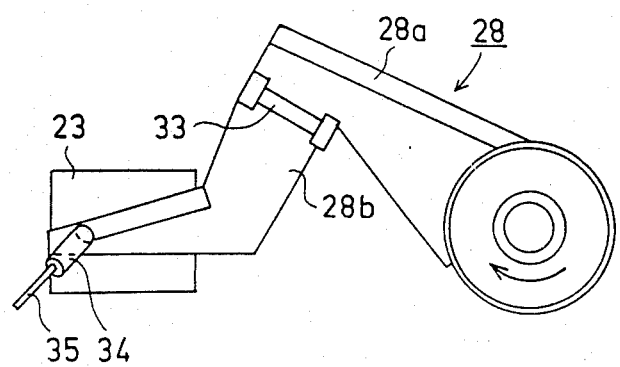
FIG. 4 shows the vane means of FIG. 3, in top view.

In the embodiment of FIGS. 3 and 4, the vane means 28 comprises the vane parts 28a and 28b. The vane part 28a is rigid and has been disposed to rotate about the shaft 36. The rigid vane part 28a may therefore bend elastically at its root only. The other vane part 28b has been connected to the rigid vane part 28a by the aid of a hinge means 33, whereby the other vane part 28b is free to turn about the hinge means 33. The hinge axle of the hinge means 33 is substantially parallel to the longitudinal axis of the rigid vane part 28a, i.e., the hinge axle of the hinge means 33 is radially oriented.

By the vane means of FIGS. 3 and 4, the advantage is gained that if such chips have accumulated on the rim of the aperture 23 which have not yet gone through the aperture 23 into the tube means 30, the hinged vane part 28b of the vane means 28 can fall down immediately after passing the aperture 23, whereby on the next stroke of the vane means 28, the vane means 28 will efficiently push the chips forward towards the aperture 23. When the vane means 28 in the course of its stroke hits against the chip heap on the margin of the aperture 23, the hinged vane part 28b of the vane means 28 is naturally free to rise upwardly, but the rigid vane part 28a of the vane means 28 instead remains in its horizontal plane. A vane means 28 of this kind therefore ensures the reliable operation of the feeding means 10, and chips in sufficient quantity are all the time delivered before the piston means 22 of the feeding means 10.

As shown in FIGS. 3 and 4, there has preferably further to the hinged vane part 28b of the vane means 28 been affixed a sleeve-like member 34, to which in its turn has been attached a flexible, whip-resembling member 35 advantageously. The whip-like member 35 consists of a flexible steel wire. A vane means 28 provided with such a whip-like member 35 at the same time causes any solid fuel 32 that may adhere to the walls of the silo 27 to fall down into the lower part of the silo, whereby in an embodiment of this type the mixing arm 29 is superfluous.

The tube means 30 conducting the solid fuel 32 to the heating boiler 31 is advantageously composed of a plurality of tubular parts joined together. It should be particularly noted that the second tubular section has a larger diameter than the first tubular section, and similarly the diameter of the third tubular section exceeds that of the second tubular section, and so on. A widening tube means 30 of this kind reliably counteracts the tendency of the solid fuel 32 to travel back in the tube 30. The tube means 30 is advantageously an elastic tube means, whereby the feeding means of the invention 10, and similarly the tube means 30, may be mounted in any desired position with reference to the heating boiler 31. Likewise, the elastic tubular design affords easy and simple length adjustability of the tube means 30. As material for the tube means one may use steel, or equally well plastic or another equivalent material.

In the foregoing only the principle solution of the invention has been presented, and one advantageous embodiment thereof. It is obvious to a person skilled in the art that the invention may be modified in numerous different ways within the scope of the inventive idea expressed in the claims following below.

We claim:

1. Feeding means for feeding solid fuel from a storage silo to a heating boiler, said feeding means comprising
   piston means adapted to move reciprocatingly,
   tube means communicating with the heating boiler and in which said piston means is disposed,
   aperture means communicating said tube means with the storage silo,
   vane means rotatably disposed within a lower portion of the storage silo to effectuate delivery of the solid fuel from the storage silo to the boiler through said tube means, said vane means comprising a substantially rigid portion, and a turnable portion, and
   hinge means for interconnecting said turnable and substantially rigid portions of said vane means, said hinge means comprising a hinge axle substantially parallel with a longitudinal axis of said substantially rigid portion of said vane means.

2. The feeding means of claim 1, further comprising a flexible, whip-like member attached to said turnable portion of said vane means.

3. The feeding means of claim 2, wherein
   said flexible, whip-like member is in the form of a steel wire, and further comprising
   a sleeve-like member affixing said whip-like member to said turnable portion of said vane means.

4. The feeding means of claim 1, wherein
   rotary movement of said vane means inside the storage silo being synchronized with the reciprocating motion of said piston means.

5. The feeding means of claim 1, further comprising an edge of said piston means being substantially V-shaped.

6. The feeding means of claim 1, further comprising an upper rim of said aperture means being shaped to constitute a sharp cutting edge.

7. The feeding means of claim 1, the improvement further comprising
generating means for generating the reciprocating motion of said piston means, said generating means comprising
drive means,
pawl means,
transmission means disposed such that said drive means drives said pawl means through said transmission means,
a ratchet wheel disposed such that said pawl means drives the same, and
a connecting rod interconnecting said ratchet wheel and said piston means, such that rotary motion of said ratchet wheel is transmitted through said connecting rod to said piston means.

8. The feeding means of claim 7, wherein
said transmission means comprises
a shaft engaged with said drive means,
a lever arm engaged with said shaft, and
a connecting rod engaged with said lever arm and with said pawl means.

9. The feeding means of claim 7, further comprising locking pawl means for engaging and limiting rotation of said ratchet wheel.

10. The feeding means of claim 1, further comprising
a mixing arm disposed within the storage silo for dropping any solid fuel that may adhere to the wall of the storage silo.

11. The feeding means of claim 1, wherein
said tube means leading to the heating boiler comprises a plurality of tubular portions interconnected with one another such that in the direction towards the heating boiler, a subsequent tubular portion has a larger diameter than a preceding, adjacent tubular portion.

12. The feeding means of claim 11, wherein
said tube means is elastic.

* * * * *